March 30, 1948. E. E. MARTIN 2,438,642
APPARATUS FOR INSERTING VALVE ELEMENTS
Filed Nov. 20, 1944
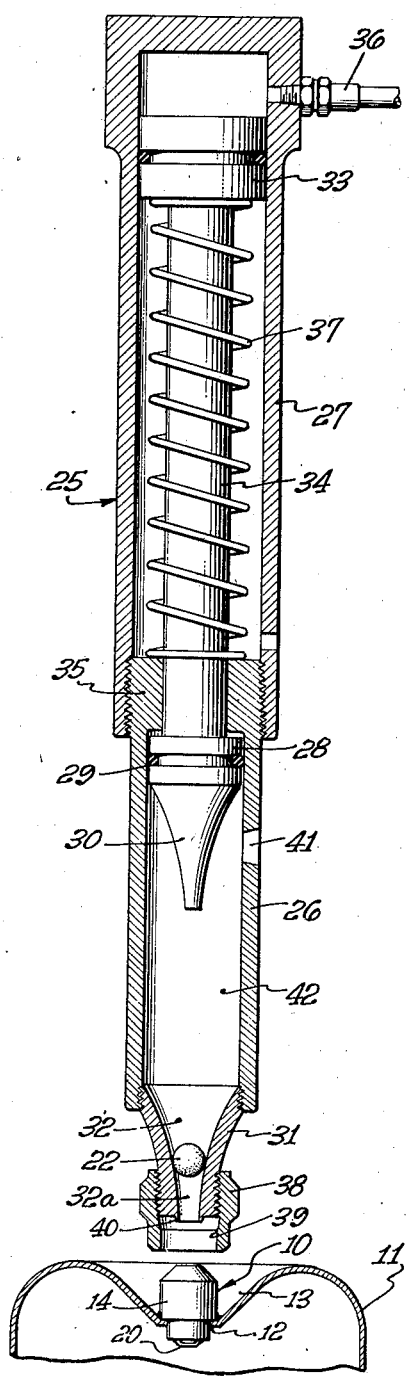
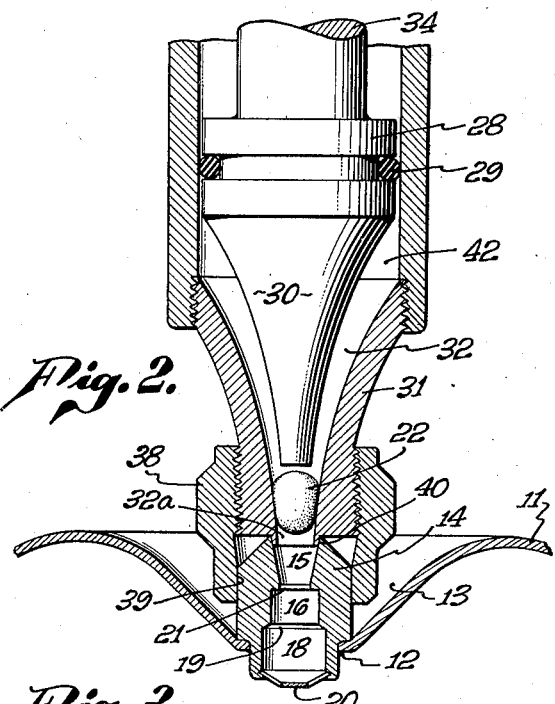
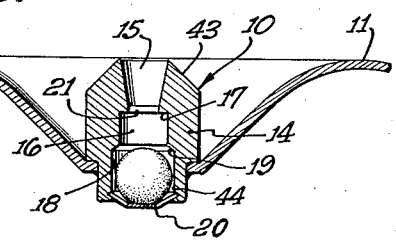
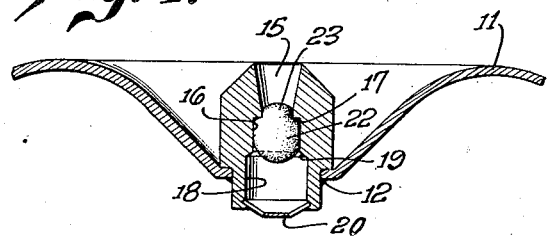
EARNEST E. MARTIN,
INVENTOR.
BY
ATTORNEY.

Patented Mar. 30, 1948

2,438,642

UNITED STATES PATENT OFFICE 2,438,642

APPARATUS FOR INSERTING VALVE ELEMENTS

Earnest E. Martin, Redondo Beach, Calif., assignor to Ralph Walsh, Los Angeles, Calif.

Application November 20, 1944, Serial No. 564,353

2 Claims. (Cl. 29—235)

This invention has to do with a novel type and form of device for inserting a deformable valve or sealing element in a body or fitting.

In my copending application Ser. No. 564,352 filed on even date herewith, I describe a valve or sealing device possessing certain characteristic and novel features, among which is its adaptability for insertion of a deformable valve or sealing element into the body of the device through an opening which is to be closed by the element and which is of relatively smaller size. The general object of the present invention is to provide an inserting tool capable of subjecting the element to pressure in a manner causing it to be deformed and projected into the body or fitting.

While it is contemplated that the valve element may have any suitable form and composition, preferably I use a substantially spherical or ball-shaped valve made of rubber of proper hardness. As will appear, the valve dimension is so predetermined with relation to the sizes of the body passage and bore, as to permit insertion of the element by relatively low applied pressure to a position in the body from which the element cannot be reversely displaced by relatively great oppositely applied pressure.

A particular object is to provide an inserting device whereby the valve element is subjected to fluid pressure in a manner producing initial deformation of the element and the application thereto of fluid pressure sufficiently sustained to follow the element through into the body. Also contemplated is the use of a movable member engageable against the element and cooperating with the applied fluid pressure to project the element into the body.

The invention and all its features and objects will be understood to better advantage from the following description of the typical embodiment shown by the accompanying drawing, in which:

Fig. 1 is a sectional view showing the ball inserting tool, with the container fitting appearing in elevation;

Fig. 2 is an enlarged fragmentary sectional view showing the inserting tool applied to the fitting with the plunger extension approaching the ball contacting position;

Fig. 3 shows the ball in open or non-sealing position within the fitting; and

Fig. 4 illustrates the ball position when forced by the container pressure into sealing condition within the fitting.

Typically the closure or valve device is shown to consist of a fitting, generally indicated at 10, applied to a container 11 for pressure fluids. For example, the fitting has proven particularly successful as a filling and sealing device for aerosol type insecticide containers which are filled through the fitting 10 with a high vapor pressure composition such as a solution of pyrethrum and sesame oil in dichlorodifluoromethane, the latter having a normal vapor pressure of around 70–80 pounds per square inch. Although incidental to the invention, the fitting 10 is shown to be welded at 12 within the cavitated bottom portion 13 of the container.

The fitting comprises a tubular body 14 containing a passage 15 opening into and tapering toward a cylindrical bore 16. In the juncture of the passage and the bore is an annular shoulder 17 formed at substantially 90° with the wall of the bore 16. Counter-bore 18 joins the bore 16 at the tapered shoulder 19, and contains at its lower end a spider or apertured support 20 for the ball check. As typical dimensions within a fitting adapted to the particular purpose illustrated, counter-bore 18 may have a diameter of 0.250 inch, bore 16 a diameter of 0.187 inch and the throat a diameter at 21 of about 0.125 inch.

The fitting contains a ball check 22 made of a suitable elastic and deformable material, preferably a rubber resistant to any solvent properties of the container solution, and where the ball is to be inserted through the passage 15 as later explained, having the proper hardness to thereafter resist displacement out of the fitting and yet maintain a perfect fluid-tight seal. In the type and size fitting shown, the rubber ball will have a hardness within the range of 40–65 by the Shore durometer. Of essential importance is the relationship between the ball size and the diameter of the bore 16. The ball diameter is larger than the bore diameter, typically in the size fitting described, by an amount not in excess of 0.010 inch. Successful results have been had where the ball diameter exceeds the bore diameter by 0.005 inch.

It is to be particularly observed that the sealing action and effect of the ball are fundamentally different from those of an ordinary ball check which maintains its seal solely at and by virtue of engagement with an annular seat. Referring to Fig. 4, when the ball 22 is displaced by the container pressure upwardly from the position of Fig. 3 into the bore 16, the ball, having a larger diameter than the bore, is radially compressed and deformed when a diameter of the ball enters the bore. The pressure displaces the ball until it engages against the shoulder 17, and depending upon the magnitude of the pressure, a greater or lesser quantity of the rubber may become displaced at 23 into the throat 21 and passage 15, but however without forcing the ball out of the fitting even under extremely high pressures. The primary seal is effected at the surfaces of engagement between the ball and the bore 16. After engagement of the ball with shoulder 17, the pressure applied to the bore tends to expand it tightly against the bore wall, and the tightness of the engagement and seal increase as the pressure increases. A secondary seal is of course maintained by the ball engagement against and within the shoulder 17, but as indicated, the primary function of the shoulder is to support the ball for radial expansion under the applied pressure against the bore wall 16.

It may be mentioned that if desirable, the fitting may be permanently sealed after the container 11 is charged, by filling passage 15 above the ball with solder or other permanent sealing material.

For various reasons, as under the following circumstances, it may be desirable to provide for the insertion of the ball into the fitting through the passage 15. Attachment of the fitting 10 to the container may be effected by completing the weld at 12 by heating the container and fitting in an oven at a temperature of around 500° F. Obviously, the rubber ball would be injured at this temperature; hence the desirability for inserting the ball into the fitting after the latter is welded to the container.

The invention contemplates broadly the use of ball inserting means operable to apply pressure to the ball in a manner causing it to be radially deformed and projected through passage 15 into the fitting. Particularly the invention contemplates the application of fluid pressure and force against the ball, in a manner and amount such as to cause the ball to be projected into the fitting with a stream of the fluid.

As illustrated, the inserting tool, generally indicated at 25, is shown to comprise suitably interconnected barrel and cylinder sections 26 and 27 which may have differential diameters, substantially as illustrated. The barrel 26 contains a plunger 28 carrying a sealing ring 29 and a downwardly curved and convergent extension 30. The lower end of the barrel carries a tubular nozzle 31, the bore 32 of which is shaped substantially in conformance with the plunger extension 30. Plunger 28 is connected to a piston 33 in the cylinder 27 by a rod 34 which extends through the bearing 35. Compressed air introduced to cylinder 27 above the piston 33 from line 36 under control of a suitable valve (not shown) displaces the piston and plunger downward against the resistance of coil spring 37, and the latter returns the parts to the position illustrated when the air pressure is relieved.

The nozzle 31 carries a guide nut 38 engageable with the fitting 10 upon relative movement together of the inserting tool and fitting, see Fig. 2, as by elevation of the container 11. The guide nut 38 contains a bore 39 which receives the body of the fitting, and the lower end of the nozzle 31 has a projecting lip 40 which enters the upper end of the passage 15. At its lower end 32a, the nozzle bore is substantially straight, or has just slight downward taper.

Assuming the inserting tool to be applied to the fitting and the plunger 28 to be in the position of Fig. 1, the ball 22 may be inserted through an opening 41 in the side of the barrel and dropped into the nozzle passage as illustrated. As it moves downward below the opening 41, the plunger 28 compresses the air in chamber 42 to a high degree sufficient to force the ball 22 downwardly within the converging throat of the nozzle bore, as exemplified in Fig. 2. Thus the ball becomes elongated and radially reduced, while high air pressure continues to be exerted against the ball, tending to force it through into the fitting. In this condition, the ball is engaged by the lower end of the plunger extension 30 as the latter approaches or nears the lower limit of its travel, and as a result the ball is projected out of the nozzle bore and through passage 15 and bore 16 into the fitting counterbore 18. It may be mentioned that in practice, the downward travel of the plunger and the projection of the ball in the fitting can be made to occur almost instantaneously.

It is not essential to the operation of the injecting tool that the ball be inserted in the barrel 42, as described. Instead, the ball first may be inserted by hand within the passage 15 and the tool 25 then applied to the fitting. Downward movement of the plunger serves, as before, to deform and crowd the ball downwardly within the passage 15, and at the end of its travel, the plunger extension 30 engages the ball and causes it to be projected into the counter-bore 18.

With the ball now contained in the fitting and in the position of Fig. 3, the tapered surface 43 of the fitting may be applied to the head or nozzle of a filling machine, and fluid introduced to the container through the clearance at 44 between the ball and larger diameter counterbore 18. Upon the introduction of a high pressure fluid to the container, the ball 22 closes into the bore 16 to form a fluid-tight seal, all as previously explained.

I claim:

1. A device for inserting an individual elastic deformable closure element through a passage having a smaller diameter than said element into an enlarged space beyond said passage, that includes a separate body containing a chamber and a tapered restricted outlet smaller than said element and communicable with said passage, a plunger within said body operable to develop and apply gas pressure to said element when positioned in said restricted outlet, and movable means engageable with the element to project it under the applied gas pressure through the passage into said space.

2. A device for inserting an individual elastic deformable closure element through a passage having a smaller diameter than said element into an enlarged space beyond said passage, that includes a separate body containing a chamber having a convergent end portion communicable with said passage, a plunger within said body operable to develop and apply gas pressure to said element when positioned in said convergent end portion of the chamber, and a projection carried by the end of said plunger and engageable with said element only after it has been deformed by the gas pressure to project the element at high velocity completely through the passage into said space.

EARNEST E. MARTIN.

REFERENCES CITED

The following references are of record in the file of this patent:

UNITED STATES PATENTS

| Number | Name | Date |
| --- | --- | --- |
| 864,226 | Blodgett | Aug. 27, 1907 |
| 1,474,227 | Boisset | Nov. 13, 1923 |
| 1,733,610 | Leipert | Oct. 29, 1929 |
| 1,739,270 | Thiry | Dec. 10, 1929 |
| 1,913,933 | Lamborn et al. | June 13, 1933 |
| 2,031,797 | Tarbox | Feb. 25, 1936 |

FOREIGN PATENTS

| Number | Country | Date |
| --- | --- | --- |
| 809,915 | France | Dec. 19, 1936 |